United States Patent [19]

Pierce et al.

[11] Patent Number: 5,469,497
[45] Date of Patent: Nov. 21, 1995

[54] NETWORKED INTERACTIVE CALL MANAGEMENT SUBSYSTEMS WITH PREVENTION OF SIMULTANEOUS USE OF A SINGLE ACCOUNT NUMBER

[75] Inventors: George C. Pierce, Sarasota; Don C. Fletcher, Lakeland, both of Fla.

[73] Assignee: Teledebit, Sarasota, Fla.

[21] Appl. No.: 285,881

[22] Filed: Aug. 4, 1994

Related U.S. Application Data

[63] Continuation of Ser. No. 5,658, Jan. 19, 1993, abandoned.

[51] Int. Cl.⁶ .............................. H04M 17/00; H04M 1/66
[52] U.S. Cl. .......................... 379/115; 379/88; 379/91; 379/144; 379/188; 379/196; 379/216
[58] Field of Search ................................. 379/89, 90, 91, 379/67, 88, 112, 114, 115, 143, 144, 145, 149, 154, 155, 187, 189, 196, 197, 199, 201, 207, 216

[56] References Cited

U.S. PATENT DOCUMENTS

| | | | |
|---|---|---|---|
| 4,611,094 | 9/1986 | Asmuth et al. | 379/201 |
| 4,706,275 | 11/1987 | Kamil | 379/144 |
| 4,756,020 | 7/1988 | Fodale | 379/112 |
| 4,761,808 | 8/1988 | Howard | 379/112 X |
| 4,768,222 | 8/1988 | Kalfon | 379/91 |
| 4,847,890 | 7/1989 | Solomon et al. | 379/67 |
| 4,908,850 | 3/1990 | Masson et al. | 379/88 |
| 4,935,956 | 6/1990 | Hellwarth et al. | 379/112 |
| 5,003,584 | 3/1991 | Benyacar et al. | 379/119 |
| 5,068,891 | 11/1991 | Marshall | 379/91 |
| 5,138,650 | 8/1992 | Stahl et al. | 379/145 |
| 5,150,399 | 9/1992 | Yasuda | 379/143 |
| 5,187,740 | 2/1993 | Swaim et al. | 379/209 |
| 5,199,062 | 3/1993 | Von Meister et al. | 379/89 |
| 5,210,789 | 5/1993 | Jeffus et al. | 379/127 |
| 5,220,501 | 6/1993 | Lawlor et al. | 379/90 |
| 5,222,120 | 6/1993 | McLeod et al. | 379/89 |
| 5,223,699 | 6/1993 | Flynn et al. | 379/144 |
| 5,233,647 | 8/1993 | Ibarez Palomegue et al. | 379/112 |
| 5,287,403 | 2/1994 | Atkins et al. | 379/144 |
| 5,297,189 | 3/1994 | Chabernaud | 379/58 |
| 5,303,205 | 4/1994 | Kerihuel et al. | 379/58 |
| 5,311,572 | 5/1994 | Friedes et al. | 379/67 |
| 5,353,335 | 10/1994 | D'Urso et al. | 379/67 |
| 5,353,336 | 10/1994 | Hou et al. | 379/67 |
| 5,365,580 | 11/1994 | Morisaki | 379/185 |

OTHER PUBLICATIONS

"Summary of NTS Features", National Applied Computer Technologies, Chapter One Overview, Release 4.0, May 1991.
"The LCX IZOC Switch", National Applied Computer Technologies Jul. 18, 1991.
Summary of NTS Features, National Applied Computer Technologies, Chapter One—Overview, Release 4.0, May, 1991.
The LCX 120C Switch, National Applied Computer Technologies, Jul. 18, 1991.
News from NACT, National Applied Computer Technologies, Dec. 1991.

*Primary Examiner*—Jeffery A. Hofsass
*Assistant Examiner*—Scott L. Weaver
*Attorney, Agent, or Firm*—Steve Mendelsohn; William H. Murray

[57] ABSTRACT

A telecommunications system allows multiple users to place and charge telephone calls to personal debit accounts without requiring specially designed telephones or "smart" cards. The system keeps track of the cost of each call, including applicable taxes, in real time and notifies the user when the account balance approaches zero. The system allows the user to restore the account balance in real time either manually or automatically by charging the increase to a commercial credit card. The system has multiple interactive call management subsystems, each subsystem having its own database. When one database in one subsystem is updated, signals are transmitted between subsystems to update every other database. An account in use flag is transmitted from a serving subsystem through a network to each of the other subsystems to prevent simultaneous use of an account.

8 Claims, 5 Drawing Sheets

FIG. 2 CUSTOMER SERVICE & ACCOUNTING SYSTEM CSAS BLOCK DIAGRAM (VERSION 12/30/92)

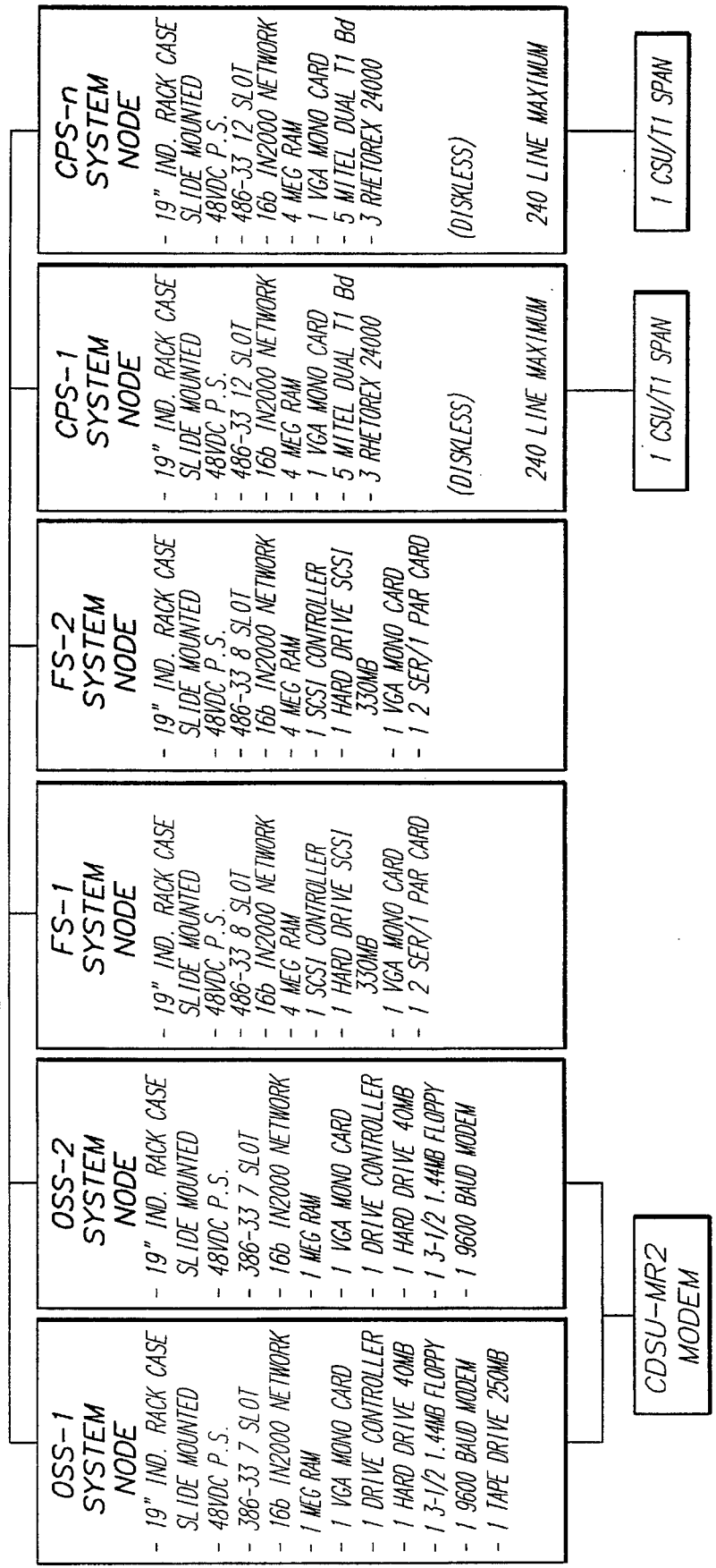
FIG. 4  ICMS BLOCK DIAGRAM (VERSION 12/30/92)

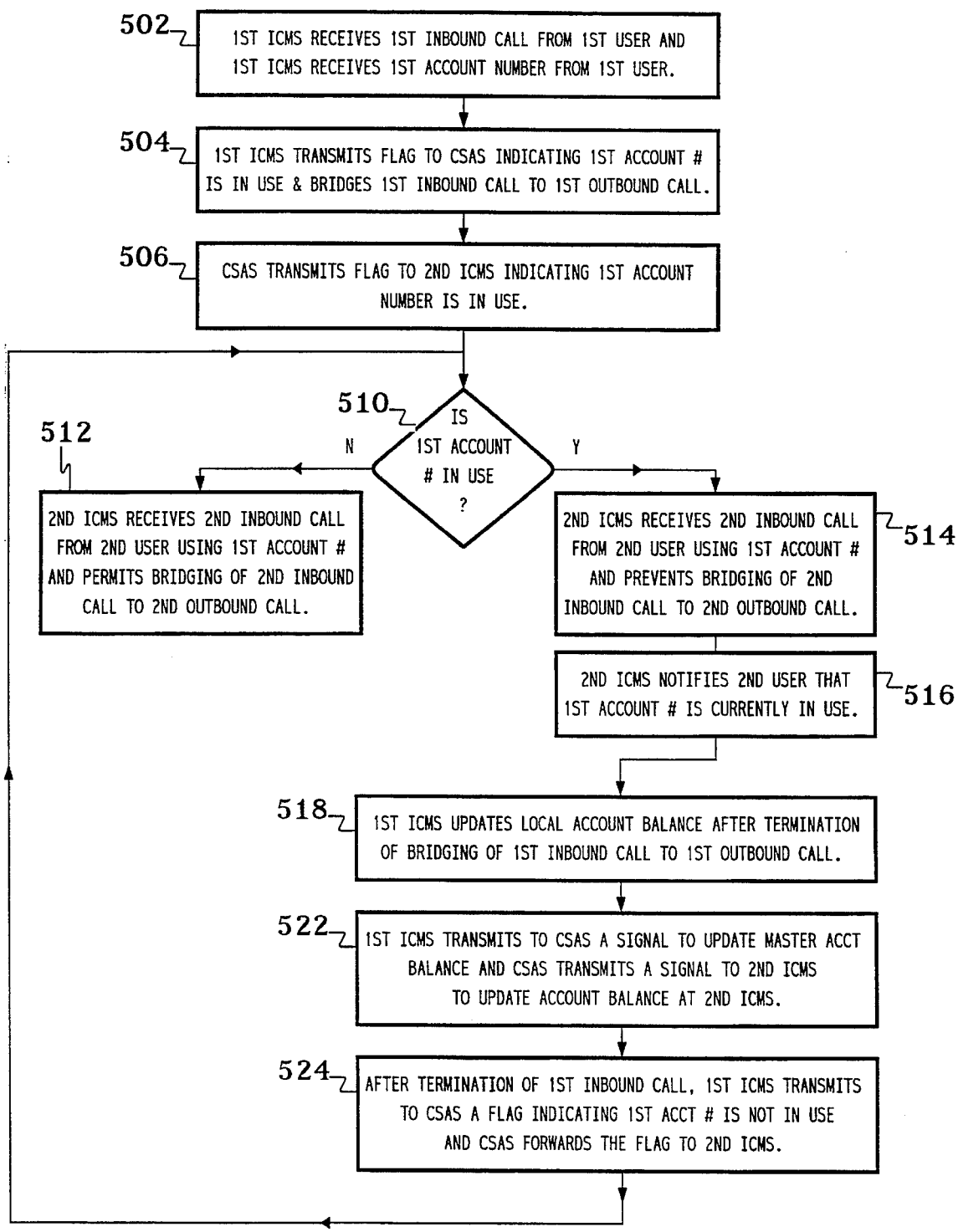

NETWORKED INTERACTIVE CALL MANAGEMENT SUBSYSTEMS WITH PREVENTION OF SIMULTANEOUS USE OF A SINGLE ACCOUNT NUMBER

This is a continuation of application Ser. No. 08/005,658 filed on Jan. 19, 1993, abandoned.

BACKGROUND OF THE INVENTION

This application is related to U.S. application Ser. Nos. 08/005,660, 08/005,620, now U.S. Pat. No. 5,408,519, and 08/005,616, abandoned, all of which were filed on Jan. 19, 1993.

1. Field of the Invention

The present invention relates to telecommunications systems, and, in particular, to a system for managing interactive telephone calls charged to a debit account.

2. Statement of Related Art

For years, companies such as AT&T, the Bell Operating Companies, Sprint, and MCI have offered to the public commercial telephone credit cards, usually referred to as calling cards. Each customer is given a unique account number that can be used to charge telephone calls to the customer's credit account. Each month, the card-issuing company presents the customer with a bill for the accumulated charges. The customer must then pay the bill, for example, by check or by charging to a commercial credit card. If the customer does not pay on time, the company must take additional actions to attempt to collect from the customer. These billing and collection efforts cost time and money to both the company and the customer.

In commercial credit card and calling card systems, anyone who has access to a customer's account number is able to charge calls to that credit account. When an account number is stolen, users can run up large charges to the credit account. Stolen credit account numbers are often sold to multiple users who make simultaneous calls using the same account number. While some of these costs may be passed on to the customer, most are absorbed as losses by the credit card companies themselves.

U.S. Pat. No. 4,768,222 (Kalfon) describes a telecommunications system that allows users to charge the costs of telephone calls using a "prepaid credit" or debit card. When a call is placed, the cost of the call is deducted from the balance on the card. Therefore, the total charges that can be placed on a given card are limited to the balance remaining on the card. However, the account balance in the Kalfon system is physically stored on the "smart" debit card itself and users can only place calls from specially designed telephones designed to accept the special debit cards.

Conventional telecommunications systems, both hardware and software, cannot practically provide a debit account system that combines the advantages of commercial telephone credit account systems with the advantages of a debit card system. For example, AT&T UNIX™-based telecommunications systems are generally too slow and/or too expensive to support the throughput required for a practical debit account system. Moreover, conventional systems accumulate charges on a message-unit basis. Such systems do not account for applicable taxes on a real-time basis and therefore do not comply with state and federal regulations. In addition, conventional systems do not provide adequate safeguards against fraud and abuse.

SUMMARY OF THE INVENTION

In a preferred embodiment, the present invention is a telecommunications system comprising control means, a first means, and a second means. The control means has a master database. The first means receives a first inbound call from a first source, provides a telecommunications service in response to the first inbound call, and transmits a first signal to the control means in response to the first inbound call. The first means has a first database. The second means is remotely located from the first means and has a second database. The second means receives a second inbound call from a second source. The control means comprises means for receiving the first signal from the first means, means for updating the master database according to the first signal, and means for transmitting a second signal to the second means. The second means further comprises means for receiving the second signal from the control means and means for updating the second database according to the second signal.

BRIEF DESCRIPTION OF THE DRAWINGS

FIG. 4 is a block diagram providing further details about the hardware and software of the interactive call management subsystem of FIG. 3.

FIG. 5 is a flow diagram of the processing of the telecommunications system of FIG. 1.

DETAILED DESCRIPTION OF THE INVENTION

Figure 1:
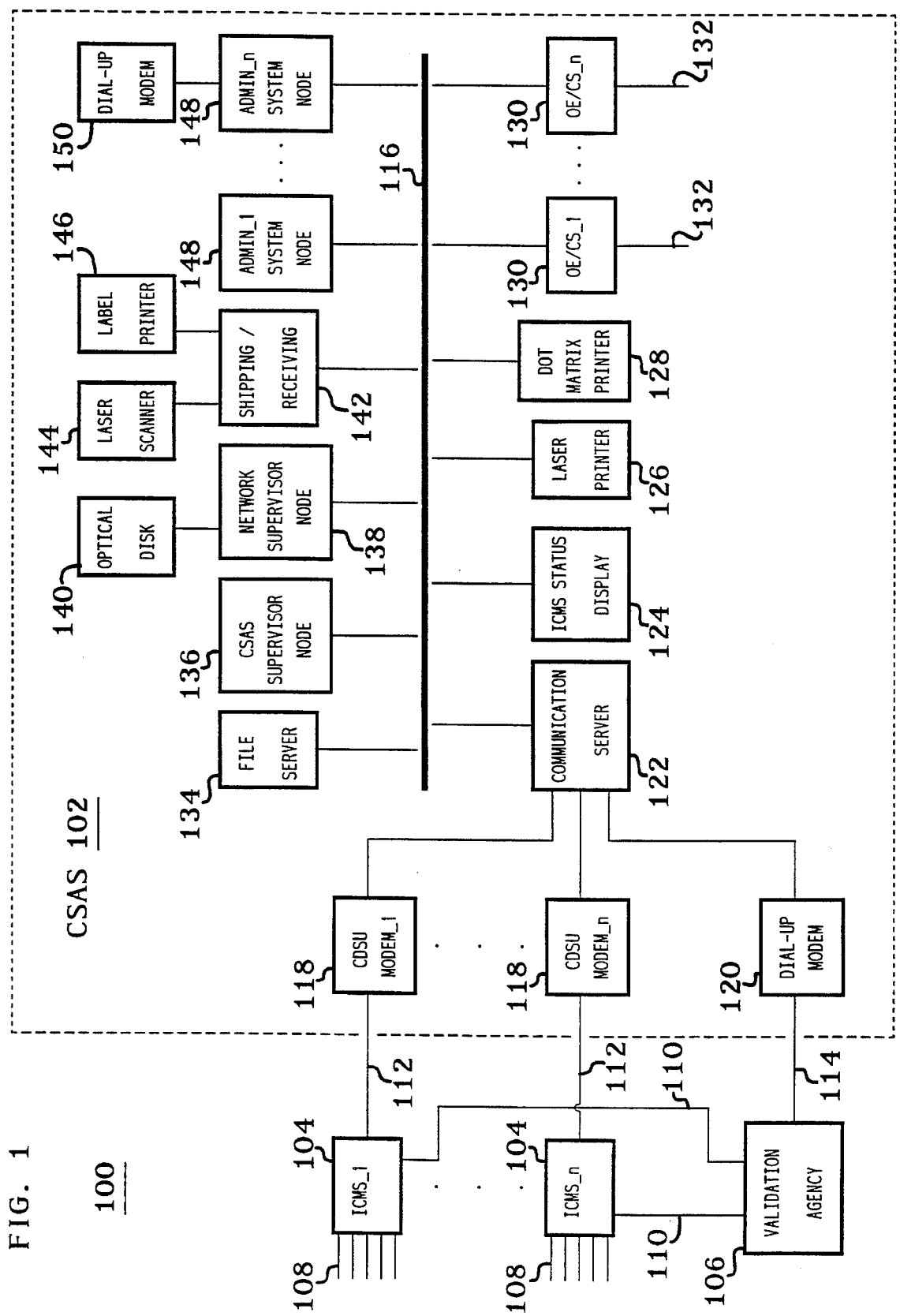
FIG. 1 is a block diagram of a preferred telecommunications system according to the present invention.

Referring now to FIG. 1, there is shown a block diagram of telecommunications system 100, a preferred embodiment of the present invention. System 100 allows users to place long-distance telephone calls from any source and charge the costs of those calls to personal debit accounts, where each debit account has a unique account number. Those skilled in the art will understand that the specific numbers used in the following description of system 100 are used for explanatory purposes only and merely represent one possible set of preferred parameter values.

Basic Features

A user dials an 800 number to establish an inbound call to system 100. System 800 prompts the user with pre-programmed voice messages to enter an account number. After verifying that the account number is valid, system 100 prompts the user to enter the destination telephone number of the party to be called. System 100 then calculates the cost per minute of the call, including taxes, and the maximum duration for a call to that destination, i.e., how long a call can be placed to the party to be called based on the current account balance.

If the maximum duration is less than a specified threshold, e.g., fifteen minutes, system 100 prompts the user with the option of increasing the account balance by charging the increase to a commercial credit card such as a VISA™, MasterCard™ American Express™, or Discover™ credit card. System 100 prompts the user to enter the account number, expiration date, and billing ZIP code for the commercial credit card. System 100 then contacts a validation agency in real time to acquire authorization to charge the desired debit account increase to the commercial credit card. In a preferred embodiment, system 100 allows the user only to increase the account balance by the original face value of the account. In another preferred embodiment, system 100 allows the user to increase the account balance by any specified amount, if authorization is provided by the validation agency.

Whether the account balance is increased or not, system 100 then places an outbound call to the specified destination. If the outbound call is answered, system 100 bridges the user's inbound call to the outbound call to establish a bridged call. The answering of an outbound call is preferably determined by standard industry methods generally in use for ascertaining answer, including hardware answer supervision in which the carrier sends a signal to system 100.

System 100 monitors the cost of a bridged call in real time and signals the user when the account balance approaches zero. In a preferred embodiment, system 100 broadcasts three short tones to the user and the called party when there are sufficient funds in the account balance for only three more minutes of the bridged call. System 100 also broadcasts two short tones and one short tone at the two-minute and one-minute milestones, respectively, and one longer tone of about one-half second when there are only fifteen seconds left. When time has expired, indicating that the account balance is depleted, or if the called party hangs up, system 100 terminates the outbound call, but maintains the user's inbound call. Similarly, if, at any time, the user hangs up, system 100 terminates both the inbound and outbound calls.

System 100 decrements the cost of the just-completed call from the account balance in real time and informs the user of the remaining balance if the user is still connected. If system 100 had signaled the user that the account balance was low, then system 100 again allows the user to restore the account balance by charging to a commercial credit card, or by transferring the balance of a second debit account to the account in use.

System 100 allows the user to place or attempt to place one or more additional outbound calls without having to re-enter the account number or re-dial the 800 number. Thus, after a bridged call is concluded or if the called party does not answer, system 100 allows the user to attempt another outbound call and, if necessary, restore the account balance.

Real-Time Cost Rating

Prior to initiation of an outbound call, system 100 performs real-time cost rating to determine the first-minute and additional-minute costs, including taxes, of bridging the user to the desired destination. Based on these costs and the existing account balance, system 100 calculates the maximum duration in one-minute increments for the call. If this maximum duration is less than a specified threshold, e.g., fifteen minutes, system 100 prompts the user with the option of increasing the account balance before attempting the outbound call.

After successfully bridging the user to the called party, system 100 monitors the "cost" of the call in real time by decrementing a counter that was originally set equal to the maximum duration of the call. System 100 uses this counter to determine when to send the short-tone and long-tone signals to notify the user that the account balance is approaching zero. System 100 also uses this counter to determine the length and therefore the cost of the bridged call. After the outbound call is terminated, system 100 updates the account balance in real time by decrementing the cost of the bridged call from the account balance that existed just prior to the initiation of the outbound call. System 100 does not decrement the account balance if the outbound call is not answered.

System 100 determines the first-minute and additional-minute costs of the desired call from the distance and timing of the call. Costs for all mileage sensitive calls are based on the distance between rate centers associated with the user and the party to be called as calculated from the vertical V and horizontal H coordinates. The distance D between rate centers is determined by:

$$D = \sqrt{(V1 - V2)^2 + (H1 - H2)^2} \quad , \qquad (1)$$

where (V1, H1) are the vertical and horizontal coordinates of the rate center associated with the user and (V2, H2) are similar coordinates for the party to be called.

The distance D is then used as an index for look-up tables that contain the first-minute and additional-minute costs for calls made at different times of day and days of year. For example, different cost tables may apply for day, evening, and night as well as for weekdays, weekends, and holidays.

System 100 also accounts for taxes in real time when calculating the maximum duration of a desired call and when determining the cost of a completed call. These taxes include all federal, state, and local taxes (e.g., excise tax, gross receipts tax, sales tax, municipal utilities tax).

When the desired destination is to a 900 number or other similar special charge number, system 100 blocks access to such numbers.

Additional Features

In a preferred embodiment, system 100 provides many other services to users.

System 100 allows a set of one or more users to create customized voice prompts that will be directed only to those users. These customized voice prompts may include voice prompts in languages other than English. For example, Spanish-speaking users can obtain debit accounts that are sent voice prompts in Spanish. In addition, users who receive their debit accounts from the same source, for example, a national retailer may be sent customized voice prompts prepared specifically for that retailer.

System 100 permits fast entry of DTMF (dual tone multi-frequency) responses. That is, the user may respond with the desired keypad entry prior to the completion of a voice prompt message. The user may make his entry any time after system 100 sends a chime signal to the user.

At any time after the user enters a valid account number, system 100 allows the user to check the existing account balance.

If the called party does not answer within a specified period of time, for example, the equivalent of approximately seven rings, system 100 gives the user the option of placing another call or continuing with the current call. System 100 may treat the continued call as an answered call and decrement the account balance accordingly, whether or not the called party actually answers.

System 100 allows the user to arrange for automatic renewal of the account balance on a regular basis. In a preferred embodiment, for example, a user may arrange to have the $25.00 face value of a debit account restored automatically a maximum of one time every seven days if and when the account balance falls below $5.00. When system 100 detects a low account balance, system 100 automatically validates and receives authorization to charge the increase to the user's pre-selected commercial credit card. System 100 provides this service automatically in real time without explicit notification to or additional authorization from the user.

If the debit account has already been restored during that seven-day period, system 100 will not restore the balance a second time as a protection against fraud. On the other hand, system 100 increases the account balance only when it needs to be increased. In an alternative preferred embodiment, system determines when to restore the account balance by referring to the maximum duration of a call rather than to the dollar amount in the account balance.

System 100 allows a user to transfer funds from a second debit account to the one in use. In a preferred embodiment, system 100 also allows a user to access a second debit account by entering a second account number after the completion of a call using a first debit account during the same inbound call.

System 100 allows a user to program up to ten speed dial numbers. A speed dial number is a one-digit code selected by the user to represent a desired destination telephone number. The user first dials the asterisk key to notify system 100 that the next digit corresponds to a speed dial number.

System 100 allows a user to restrict the destinations to which a debit account may be used to place calls. These restricted destinations may be limited to pre-selected speed dial numbers. System 100 allows a user to change these restrictions upon entry of a four-digit PIN number assigned to the user. For example, a parent may give a debit account to a child in college, but may restrict the usage of that debit account to a single speed dial number corresponding to the parent's home.

After an inbound call is established, system 100 allows a user to contact a customer service representative by entering a special sequence, such as "*#".

System 100 preferably provides voice message forwarding. In voice message forwarding, when there is no answer at the desired destination, system 100 allows the user to record a message. After the user hangs up, system 100 will periodically attempt to establish an outbound call to the desired destination. If and when the outbound call is established, system 100 sends the user's pre-recorded message to the called party.

System 100 provides immediate activation of new accounts. A user can call customer service and order a debit account by charging the account balance to a commercial credit card. The user can then immediately begin to use the new debit account.

System 100 allows multiple users with different account numbers to interact with system 100 at the same time from all over a supported region, such as, the United States and Canada. After a user terminates an inbound call, another user may use that same debit account from anywhere within the supported region. System 100 updates the debit account balance in real time so that the second user will have available the adjusted account balance. System 100 preferably is able to place outbound calls to any desired destination in the world.

Fraud Prevention Features

System 100 provides several fraud prevention functions.

If the user enters an invalid account number, system 100 prompts the user to try again. As a fraud prevention measure, system 100 disconnects the inbound call after two unsuccessful attempts. If three different invalid account numbers are received by system 100 from the same source telephone number within a short period, such as five minutes, system 100 refuses to accept inbound calls placed from that source for some period, such as one hour.

If a debit account is currently in use by a first user, system 100 prevents a second user from using that same debit account from any location. If such an attempt is made, system 100 notifies the second user that the card is in use. In a preferred embodiment, system 100 allows individual debit account owners to disengage this particular fraud prevention service. Thus, an owner may allow two or more users to use the same debit account concurrently.

System 100 may also limit the amount and/or the number of times a debit account balance may be increased in a specified period of time. For example, system 100 may prevent a debit account balance from being increased either automatically or manually more than twice per week.

Those skilled in the art will understand that system 100 is designed to be flexible and therefore may be programmed to provide other services in addition to those described above.

System Configuration

Referring again to FIG. 1, system 100 comprises customer service and accounting subsystem (CSAS) 102 and one or more interactive call management subsystems (ICMS_1, . . ., ICMS_n) 104. Users access system 100 along conventional T1 lines 108 by dialing an 800 number. System 100 accesses validation agency 106 along dial-up phone lines 110, 114 to verify commercial credit card accounts and request authorization for charges to those accounts.

In a preferred embodiment, system 100 comprises four different levels of distribution, each of which supports the ability of system 100 to provide services efficiently, economically, quickly, and accurately by providing system with an additional degree of parallelism. These four levels of distribution are at (1) the system level, (2) the CSAS level, (3) the ICMS level, and (4) the call processor subsystem (CPS) level.

Distribution at the System Level

System 100 is preferably configured with multiple ICMS's 104 remotely located from CSAS 102 and remotely located from each other. In addition, system 100 may comprise one or more ICMS's 104 co-located with CSAS 102. This distributed configuration at the system level provides parallelism to system 100 and increases the capacity of system to serve users.

Each ICMS 104 communicates with CSAS 102 along 56-kilobyte high-speed data link 112. Link 112 provides two redundant sub-channels, each for two-way communication between ICMS 104 and CSAS 102. When ICMS 104 is remotely located from CSAS 102, link 112 is preferably a dedicated phone line leased from a common carrier, that is, a company or entity providing telecommunications services to the public.

When ICMS 104 is co-located with CSAS 102, ICMS 104 is preferably hard-wired to CSAS 102 along link 112 using a null modem cable. In an alternative preferred embodiment, co-located ICMS 104 and CSAS 102 are combined into one local area network.

The distributed configuration of system 100 with its multiple ICMS's and single CSAS provides system 100 with virtually unlimited expansion capability. System 100 may be expanded by adding additional ICMS's to the configuration. Additional ICMS's provide additional throughput. In other words, adding another ICMS increases the number of simultaneous users that system 100 can support.

Moreover, the remote location of ICMS's provides access to different common carriers for more efficient costing, where different common carriers charge different tariffs. Furthermore, co-locating ICMS 104 with a common carrier's point of presence (POP) (not shown) avoids charges for dedicated facilities between ICMS 104 and the POP.

Each ICMS 104 has on or more 800 numbers assigned to it. No two ICMS's share the same 800 number, except in the case of emergency re-routing. For example, if one ICMS is temporarily not in operation, the carrier may be requested to re-direct all calls for that ICMS to another ICMS.

Users may be directed to call an 800 number based on their home address or based on the receiving capability of a carrier serving a particular ICMS 104. For example, in a two-ICMS configuration with ICMS_1 104 in Washington, D.C. and ICMS_2 104 in California, users from the eastern half of the United States may be assigned the 800 number for ICMS_1 and users from the western half of the United States may be assigned the 800 number for ICMS_2. Nevertheless, a user may access system 100 from any location using any of the available 800 numbers, except that an ICMS 104 in one of the forty-eight continental states of the United States may not be able to accept calls from a non-contiguous state, such as Hawaii, if the carrier service to that ICMS is so limited.

In addition, a first ICMS may transfer an inbound call to a second ICMS, if the second ICMS has outbound capability that the first ICMS does not have. This transfer would occur after the user inputs a desired destination number that the second ICMS is better situated to handle.

CSAS 102 maintains the master databases for system 100. In addition, every ICMS 104 maintains its own copies of each database. When a user dials one of the available 800 numbers, an inbound call is established to a particular ICMS_i along a T1 line 108. All of the routine interactive functions between system 100 and a user are performed by ICMS_i. When the user enters an account number, ICMS_i verifies that the number is valid and then transmits a flag to CSAS 102 along link 112 indicating that the corresponding debit account is in use. CSAS 102 transmits that information to every other ICMS_j, so that no other user may use that same account number. When the user hangs up, another flag is sent by ICMS_i to CSAS 102 and then distributed to the other ICMS_j's notifying that the debit account is no longer in use and may therefore be used again.

After a bridged call is terminated or after the user increases the account balance, ICMS_i updates the account balance information stored in the local debit account database. ICMS_i also transmits the updated account record to CSAS 102 along link 112. CSAS 102 updates the master database accordingly and transmits that new account record to every other ICMS_j, which in turn updates its own debit account database accordingly. All of these operations occur in real time. Thus, at all times, the CSAS 102 and each ICMS 104 have identical up-to-date databases.

At the end of each outbound call, ICMS 104 generates and transmits a call record to CSAS 102 containing information pertaining to that outbound call. This information is compiled and stored by CSAS 102 for accounting and other system level functions.

Referring now to FIG. 5, there is shown a flow diagram of the processing of the telecommunications system of FIG. 1. A first ICMS 104 of FIG. 1 receives a first inbound call from a first user and the first ICMS 104 receives a first account number from the first user during the first inbound call (step 502 of FIG. 5). The first ICMS 104 bridges the first inbound call to a first outbound call, where the bridging is accomplished independent of the CSAS 102 of FIG. 1 and a second ICMS 104 of FIG. 1 (step 504).

The first ICMS 104 communicates with the CSAS 102 along a first data link 112 of FIG. 1 and the second ICMS 104 communicates with the CSAS 102 along a second data link 112. The first ICMS 104 is located remotely from the second ICMS 104 and the first ICMS 104 is also located remotely from the CSAS 102. The first ICMS 104 may be accessed by one or more users dialing one or more telephone numbers of a first set of telephone numbers and the second ICMS 104 may be accessed by the users dialing one or more telephone numbers of a second set of telephone numbers, where each of the telephone numbers of the first set is different from all of the telephone numbers of the second set.

Distribution at the CSAS Level

The customer service and accounting subsystem (CSAS) 102 is a local area network (LAN) configured around ethernet communications network 116. CSAS 102 comprises multiple nodes all linked together by ethernet network 116. As such, each node may operate independently and concurrently with each other node. This distributed configuration at the CSAS level provides additional parallelism to system 100.

Communication server 122 of CSAS 102 provides the real-time data links between CSAS 102 and each ICMS 104 along link 112 via Channel Data Service Unit(CDSU) modems 118. Each Channel Data Service Unit (CDSU) modem 18 is a 56-kilobyte digital data service (DDS) modem with two-channel channel service data service capability. Communication server 122 also provides a data link between CSAS 102 and validation agency 106 along phone line 114 via dial-up modem 120. Note that, when ICMS 104 is co-located with and hard-wired to CSAS 102, no CDSU modem 118 is required.

File server 134 provides real-time storage of all master database and voice files, storage of diskless workstation boot images, and storage of all application software.

CSAS supervisor node 136 provides voice message recording and monitors the operations of the order entry/customer service nodes 130.

Network supervisor node 138 provides backup of all system data by storage to optical disk 140.

Shipping/receiving node 142 supports card shipping and receiving functions. Users are provided with debit account cards. Each debit account card has a bar code symbol encoding a unique sequence number different from the debit account numbers. When a debit account is established, laser scanner 144 is used to read the sequence number from the bar code symbol and activate the corresponding debit account number from a secret database. Shipping/receiving node 142 keeps track of the sequence numbers and debit account numbers for accounting purposes. Label printer 146 may be used to print shipping labels for shipping or mailing debit account cards to distributors and users.

One or more administration system nodes 148 support off-line system-level functions such as rate maintenance, card generation, report generation, and accounting functions. At least one administration system node 148 accesses a dial-up modem 150 that may be used to establish a link with ICMS 104 for diagnostic checks.

ICMS status display 124 provides real-time display of the operations of all ICMS's 104 for system monitoring.

One or more order entry/customer service (OE/CS) nodes 130 provide order entry and customer service functions. Users may access customer service representatives operating OE/CS nodes 130 via dial-up lines 132 by dialing a special OE/CS phone number or during an inbound call to an ICMS 104 by entering a special DTMF sequence.

Hard copies of reports, displays, letters, etc. are generated using laser printer 126 and/or dot matrix printer 128.

Signals including data messages and commands to and from the various CSAS nodes are in Novell session packet exchange (SPX) format.

Figure 2:
FIG. 2 is a block diagram providing further details about the hardware and software of the telecommunications system of FIG. 1.

Referring now to FIG. 2, there is shown a block diagram providing further details about the hardware and software of the preferred embodiment of CSAS 102. The 16-bit Western Digital (WD) Network in each node is the ethernet card for the Novell Netware V3.1 software that implements the CSAS local area network. The Rhetorex board in CSAS supervisor node 136 supports the voice recording system.

Distribution at the ICMS Level.

Figure 3:
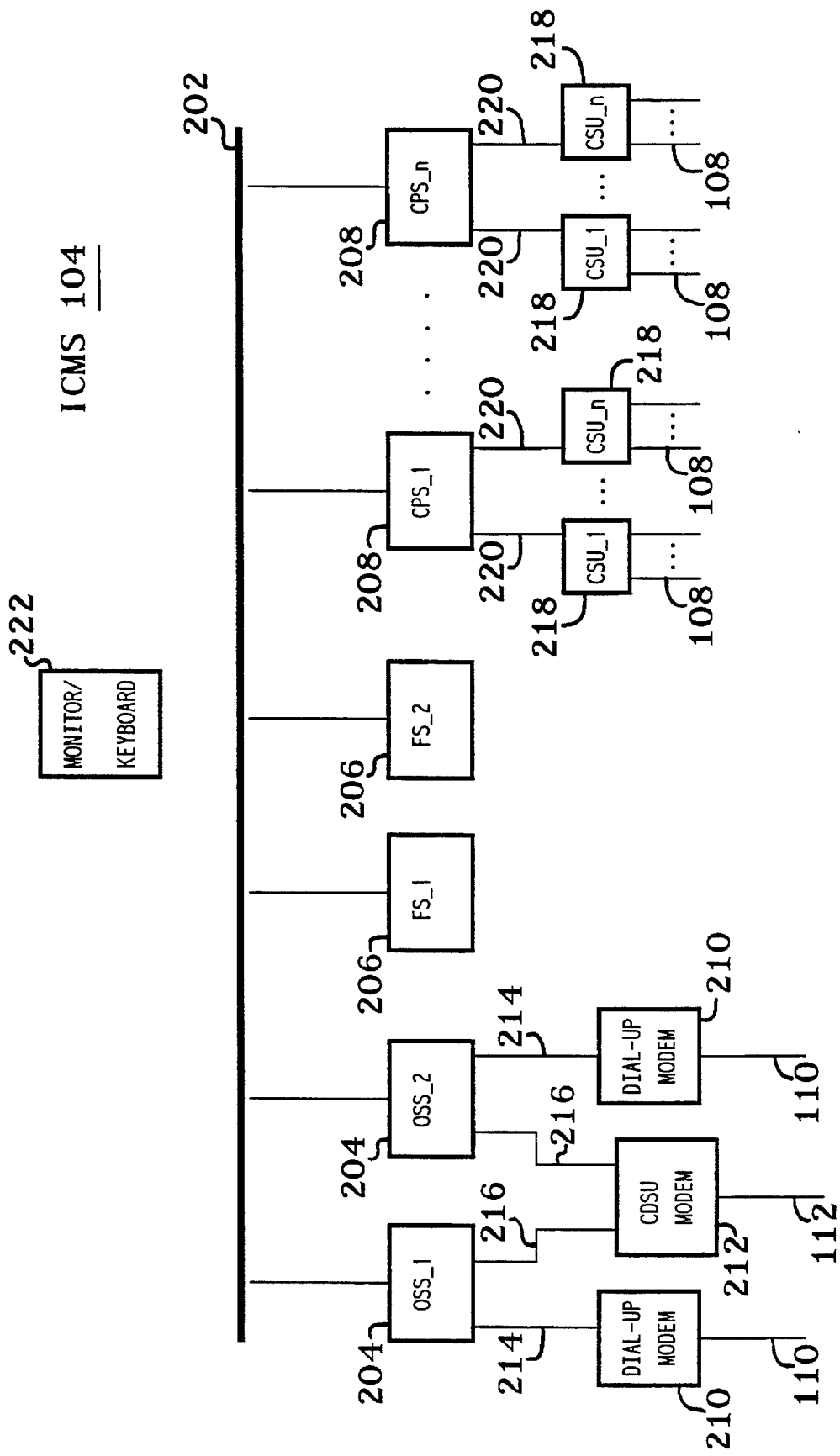
FIG. 3 is a block diagram of an interactive call management subsystem of the telecommunications system of FIG. 1.

Referring now to FIG. 3, there is shown a block diagram of interactive call management subsystem (ICMS) 104 of system according to the present invention. As with CSAS 102 of FIG. 1, ICMS 104 is a local area network (LAN) configured around an ethernet communications network 202. ICMS 104 comprises multiple nodes all linked together by ethernet network 202. As such, each node may operate independently of and concurrently with each other node. This distributed configuration at the ICMS level provides additional parallelism to system 100.

ICMS 104 preferably comprises two operations support subsystems (OSS) 204, two file servers (FS) 206, and one or more call processor subsystems (CPS) 208. Each CPS 208 implements the application software to interact and provide services to one or more users. FS 206 serves as the mass storage for ICMS 104 and OSS 204 acts as the communications link between ICMS 104 and CSAS 102 and between ICMS 104 and validation agency 101.

ICMS 104 may be expanded by adding additional CPS's 208. From a technical standpoint, any size system 100 (i.e., capable of supporting any number of simultaneous users) could be configured with a single ICMS 104. The use of multiple, remotely located ICMS's may be determined by cost considerations affected by tariffs charged by common carriers, or unique facilities available from different carriers, rather than by technical constraints.

Each CPS 208 is connected to from two to ten customer service units (CSU) 218 via standard RJ48C connections 220. Each CSU 218, in turn is connected to ten T1 lines 108. Since each T1 line 108 allows time division multiplexing to provide 24 circuits per line, each CSU 218 provides up to 240 circuits. Those skilled in the art will understand that alternatives to T1 lines 108 may be used, including loop-start, ground-start, two-wire E&M, and four-wire E&M circuits.

Each OSS 204 is connected to a dial-up modem 210 via line 214 and to a single CDSU modem 212 via line 216. Lines 214 and 216 are standard RS-232 25-pin modem cables. OSS 204 accesses validation agency 106 via T1 line 110 to act as a credit card validation server to all CPS nodes 208. OSS 204 also accesses CSAS 102 via dedicated high speed data link 112 to act as a remote access node to system 100 from CSAS 102 in order to allow file uploads, file downloads, and interactive queries of the system databases and to provide system status and interactive command dialogs with the CPS nodes 208. OSS 204 also uses link 112 to implement a data streaming function with CSAS 102 in order to allow database consistency among multiple ICMS's 104. In addition, OSS 204 monitors statistical information regarding card use in order to implement fraud detection functions. OSS 204 also monitors the status of all other nodes in order to provide system failure corrective actions.

Each FS 206 provides storage of all database and voice files, storage of diskless workstation boot images, and storage of all application software implemented by CPS 208. Data is stored in FS 206 in Fox Pro™ file format. ICMS 104 preferably comprises two FS's 206 for redundancy in case of subsystem failure. In routine operations, only one FS 206 is used although every update to a database record is made to both sets of databases in both FS's 206 in real time.

CPS 208 receives an inbound call from a user via CSU 218 and transmits voice messages to the user that are stored in voice files residing in FS 206 and random-access-memory on CPS 208. These voice messages prompt the user to enter an account number. CPS 208 receives the account number as DTMF responses from the user and verifies that the account number is valid by checking the debit account database file stored in FS 206. If the debit account is valid, CPS 208 instructs OSS 204 to send the flag to CSAS 102 via CDSU modem 212 notifying that the debit account is being used.

CPS 208 then prompts the user to enter the desired destination telephone number and performs real-time cost rating based on that destination. If the account balance is adequate, CPS 208 initiates an outbound call to the destination via CSU 218 and, if there is an answer, CPS 208 bridges the inbound and outbound calls together in order to provide a call-switching (or drop and insert) function. CPS 208 keeps track of the duration of the call and signals the user if and when the account balance approaches zero.

After the bridged call is terminated, CPS 208 updates the debit account record stored in the debit account database of FS 206 by deducting the cost of the bridged call from the account balance. CPS 208 instructs OSS 204 to transmit the updated account record to CSAS 102 via CDSU modem 212.

If the account balance is low, CPS 208 prompts the user to increase the account balance by an amount equal to the original face value of the debit account. If the user elects to do so, CPS 208 prompts the user to enter a commercial credit card account number. CPS 208 performs a checksum algorithm to verify that the credit card account number is a valid number. If the credit card account number is valid, CPS 208 instructs OSS 204 to initiate a call to validation agency 106 via dial-up modem 210. CPS 208 then prompts the user to enter the expiration date of the credit card and the ZIP code of the credit card owner's billing address. CPS 208 sends this credit card information along with the desired amount to OSS 204.

After establishing a link to validation agency 106 via dial-up modem 210, OSS 204 transmits the request for authorization to charge the credit card by the specified amount to validation agency 106. OSS 204 receives the authorization or denial from validation agency 106 and notifies CPS 208 of the result. If authorization was received, CPS 208 updates the account record stored in the debit account database in FS 206 by increasing the account balance by the debit account face value. CPS 208 also instructs OSS 204 to transmit the updated account record to CSAS 102 via CDSU modem 212.

When the inbound call is terminated, CPS 208 instructs OSS 204 to send the flag to CSAS 102 notifying that the debit account is no longer in use.

If the user has selected the automatic account balance renewal option, CPS 208 automatically restores the account balance in real time when the account balance falls below the specified threshold during a bridged call without interrupting the call or otherwise explicitly notifying the user. CPS 208 updates the account record stored in FS 206 and instructs OSS 204 to transmit the updated account record to CSAS 102 via CDSU modem 212.

In addition to sending updated account records to CSAS 102, OSS 204 also receives updated account records and new account records from CSAS 102. The updated account records may have been generated by other ICMS's 104 and forwarded by CSAS 102, while the new account records may have been generated at the OE/CS nodes 130 for new debit accounts. In either case, OSS 204 updates the debit account database stored in FS 206 accordingly. In a similar fashion, OSS 204 can receive new or updated voice messages from CSAS 102 to be stored in FS 206.

ICMS 104 preferably comprises two OSS's 204, for both redundancy and optimal performance. Although a single OSS 204 can communicate simultaneously with validation agency 106 via dial-up modem 210 and with CSAS 102 via CDSU modem 212, ICMS 104 operates with greater efficiency if those functions are divided between the two OSS's 204. In addition, while OSS_1 is linked to validation agency 106 via one dial-up modem 210, if desired, administration system node 148 can establish a link to OSS_2 via the other dial-up modem 250 to perform diagnostic systems checks on ICMS 104.

Once a link is established between OSS 204 and validation agency 106, one or more requests for authorization can be sent along that link. Validation agency 106 preferably handles requests for authorization for all credit cards accepted by system 100. When CPS 208 instructs OSS 204 to initiate a link to validation agency 106 for one user, such a link may already have been established for another user. In that case, OSS 204 maintains that link for the forthcoming request. In addition, after the last request is complete, OSS 204 maintains the link for a short period in case any additional new requests are to be made.

Monitor/keyboard 222 is provided for monitoring and maintenance of ICMS 104. Monitor/keyboard 222 may be connected to any OSS 204, FS 206, or CPS 208.

Signals including data messages and commands to and from the various ICMS nodes are in NetBIOS™ format.

Referring now to FIG. 4, there is shown a block diagram providing further details about the hardware and software of the preferred embodiment of ICMS 104. The 16-bit IN2000 Network in each node is the ethernet card for the InvisibleNet V3.1 software that implements the ICMS local area network. The five Mitel #MB89110 Dual T1 cards (distributed by the Mitel Semiconductor Division of Mitel, Inc., of Kanata, Ontario, Canada) and three Rhetorex #RDSP/24000BX Voice boards (distributed by Rhetorex, Inc. of Campbell, Calif.) in each CPS 208 support up to 240 channels per CPS 208. The Mitel cards provide the T1 interface and all the telephony functions such as switching. The Rhetorex boards provide the voice capability for ICMS 104. Those skilled in the art will understand that the relative configuration of five Mitel cards and three Rhetorex boards is a preferred embodiment of the present invention and that alternative configurations are also within the scope of the present invention.

Distribution at the CPS Level

Each CPS 208 performs multiple functions for multiple users concurrently. For example, each CPS 208 can receive multiple inbound calls from debit account users, provide voice prompts to those users, receive the users' DTMF responses, access and update databases based on those DTMF responses, initiate multiple outbound calls to desired destinations, bridge the inbound calls to the appropriate outbound calls, and monitor the timing of the bridged calls.

Each CPS 208 comprises a microprocessor that is programmed to perform these and other functions concurrently for multiple users. In order to implement these functions, the computer code for CPS 208 is designed to perform non-preemptive multitasking processing. This computer code is effectively equivalent to multiple state machines running in parallel. This distributed configuration at the CPS level provides additional parallelism to system 100.

A task is a related set of functions that a computer must perform under software control. Multitasking is a software method by which several tasks may be executed concurrently by a single computer. Preemptive multitasking is a multitasking software method wherein the particular task that is in control of the computer at some instant is caused to relinquish control temporarily by some external event, such as a clock signal or service request, and control is then passed to some other task. Non-preemptive multitasking is a multitasking software method wherein the particular task that is in control of the computer at some instant subsequently relinquishes control temporarily as a part of the normal execution of its algorithm and control is then passed to some other task.

Those skilled in the art will understand that system 100 may be designed to provide telecommunications services other than, or in addition to, the placing of outbound calls to desired destinations specified by the user. In general, the services provided by system 100 may comprise the transmission of voice communications or, subject to the transmission capabilities of the service, the transmission of data, facsimile, signaling, metering, or other similar communications. In alternative preferred embodiments, system 100 may receive inbound calls from and initiate outbound calls to other thin a person, such as a computer or facsimile machine.

In a preferred embodiment, system 100 permits users to select recorded messages to hear, for example, commentaries on specific sporting events pre-recorded by the participating athletes. Alternatively, system 100 preferably allows a user to place a call to receive a specific service, for example, a live conversation with a psychic, where the call to the psychic is pre-determined by the 800 number by which the user accesses system In a preferred embodiment, system 100 employs flexible pricing control to determine the costs to be decremented from the user's debit account for providing different telecommunications services. System 100 may determine the cost to the user for placing a call to a user-specified destination either on a fixed per-minute rate or by using a vertical and horizontal algorithm, as described earlier in this specification in conjunction with Equation (1). System 100 may also charge the user for accessing recorded messages or for calling to receive a specific service, where the charge is based on specified cost per minute rates.

It will also be understood that system 100 may also be designed to support a telecommunications credit account system.

Those skilled in the art will also understand that the term "real time" refers to those functions performed during a single inbound call from a user or within a relatively short period thereafter.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A telecommunications system comprising:

(a) a customer service and accounting subsystem (CSAS);

(b) a first interactive call management subsystem (ICMS); and (c) a second ICMS, wherein:

the first ICMS communicates with the CSAS along a first data link;

the second ICMS communicates with the CSAS along a second data link;

the first ICMS is located remotely from the second ICMS;

the first ICMS is located remotely from the CSAS;

the first ICMS may be accessed by one or more users dialing one or more telephone numbers of a first set of telephone numbers;

the second ICMS may be accessed by the users dialing one or more telephone numbers of a second set of telephone numbers;

each of the telephone numbers of the first set is different from all of the telephone numbers of the second set;

the first ICMS is adapted to receive and maintain a first inbound call from a first user;

the first ICMS is adapted to receive a first account number entered by the first user during the first inbound call;

the first ICMS is adapted to bridge the first inbound call to a first outbound call independent of the CSAS and the second ICMS, wherein the first ICMS maintains the first inbound call and the first outbound call during said bridging;

the first ICMS is adapted to transmit a flag to the CSAS during the first inbound call to indicate that the first account number is currently in use;

the CSAS is adapted to transmit the flag to the second ICMS during the first inbound call to indicate that the first account number is currently in use;

the second ICMS is adapted to receive a second inbound call from a second user during the first inbound call;

the second ICMS is adapted to receive the first account number entered by the second user during the second inbound call and during the first inbound call; and the second ICMS is adapted to prevent bridging of the second inbound call to a second outbound call during the first inbound call, if the second ICMS has received the flag indicating that the first account number is currently in use.

2. The system of claim 1, wherein the second ICMS is adapted to notify the second user during the first inbound call that the first account number is currently in use.

3. The system of claim 1, wherein the first account number corresponds to a debit account of the first user.

4. The system of claim 3, wherein:

the CSAS maintains a master database comprising a master copy of an account balance of the debit account;

the first ICMS maintains a first ICMS database comprising a first local copy of the master database;

the second ICMS maintains a second ICMS database comprising a second local copy of the master database;

the first ICMS is adapted to update the account balance of the debit account in the first local copy during the first inbound call after the bridging of the first inbound call to the first outbound call is terminated;

the first ICMS is adapted to transmit a signal to the CSAS during the first inbound call to update the account balance of the master copy in the master database; and the CSAS is adapted to transmit the signal to the second ICMS during the first inbound call to update the account balance of the second copy.

5. A method of providing telecommunications services, comprising the step of:

(a) receiving and maintaining a first inbound call from a first user by a first interactive call management subsystem (ICMS);

(b) receiving a first account number by the first ICMS from the first user during the first inbound call;

(c) bridging the first inbound call to a first outbound call by the first ICMS independent of a customer service and accounting subsystem (CSAS) and a second ICMS, wherein:

the first ICMS maintains the first inbound call and the first outbound call during said bridging;

the first ICMS communicates with the CSAS along a first data link;

the second ICMS communicates with the CSAS along a second data link;

the first ICMS is located remotely from the second ICMS;

the first ICMS is located remotely from the CSAS;

the first ICMS may be accessed by one or more users dialing one or more telephone numbers of a first set of telephone numbers;

the second ICMS may be accessed by the users dialing one or more telephone numbers of a second set of telephone numbers; and each of the telephone numbers of the first set is different from all of the telephone numbers of the second set;

(d) transmitting a flag from the first ICMS to the CSAS during the first inbound call to indicate that the first account number is currently in use;

(e) transmitting the flag from the CSAS to the second ICMS during the first inbound call to indicate that the first account number is currently in use;

(f) receiving a second inbound call by the second ICMS from a second user during the first inbound call;

(g) receiving the first account number by the second ICMS from the second user during the second inbound call and during the first inbound call; and (h) preventing bridging of the second inbound call to a second outbound call by the second ICMS during the first inbound call, if the second ICMS has received the flag indicating that the first account number is currently in use.

6. The method of claim 5, comprising the further step of notifying the second user by the second ICMS during the first inbound call that the first account number is currently in use.

7. The system of claim 5, wherein the first account number corresponds to a debit account of the first user.

8. The system of claim 7, wherein:

the CSAS has a master database comprising a master copy of an account balance of the debit account;

the first ICMS has a first ICMS database comprising a first local copy of the master database;

the second ICMS has a second ICMS database comprising a second local copy of the master database; and further comprising the steps of:

(j) updating the account balance of the debit account in the first local copy by the first ICMS during the first inbound call after the bridging of the first inbound call to the first outbound call is terminated;

(k) transmitting a signal from the first ICMS to the CSAS during the first inbound call to update the account balance of the master copy in the master database; and (l) transmitting the signal from the CSAS to the second ICMS during the first inbound call to update the account balance of the second copy.

* * * * *